Nov. 8, 1960     H. W. MUELLER     2,959,075
COMBINED DRILL AND COUNTERSINKING TOOL
Filed April 13, 1959

United States Patent Office 2,959,075
Patented Nov. 8, 1960

2,959,075

COMBINED DRILL AND COUNTERSINKING TOOL

Heinz W. Mueller, 331 E. Berkshire St., Lombard, Ill.

Filed Apr. 13, 1959, Ser. No. 806,106

2 Claims. (Cl. 77—66)

The present invention relates to improvements in cutting tools, and more particularly to a combined drill and countersinking tool in which the countersinking tool is detachably connected to the drill and is adjustable along the longitudinal axis thereof.

One object is to provide a cutting tool including a combined twist drill and countersinking collar which is locked in position on the twist drill by means of a set screw or wedge member so that the countersinking sleeve can be adjusted lengthwise of the twist drill and will engage the work after the drill has passed therethrough to form a countersink surrounding the drilled opening at one end thereof.

Another object is to provide a combined twist drill and countersinking sleeve detachably and adjustably secured thereto in which the sleeve is provided at its opposite ends with tapered portions having cutting blades adapted to cut the countersink opening in a workpiece after the drill has passed therethrough of a different taper angle. One end of the countersinking sleeve may be provided with a cutting surface adapted to form a countersink opening having a sloping wall on an angle of approximately 45°, while the opposite end may be provided with a tapered cutting surface adapted to cut a tapered countersunk opening in a workpiece in which the sloping walls have an angle of approximately 60°, the indicated angles being inclined with respect to the bore axis.

Another object is to provide a combined twist drill and countersink sleeve which can be quickly and easily attached to the twist drill by means of an Allen set screw, the inner end of which is adapted to enter the relief channel between the spiral flutes of the twist drill and thereby enter the countersinking collar securely in place.

Another object is to provide a twist drill with a detachable countersinking collar which may be secured in position by means of a set screw or the like with its inner end received in the relief groove between the spiral flutes in such a manner that when pressure is exerted thereon endwise in a direction away from the end of the drill the set screw will tightly engage the root of the relief groove due to the fact that the relief groove in present-day twist drills decreases in depth from the cutting end of the drill toward the shank thereof.

Another object is to provide a combined drill and countersinking tool in which the countersinking tool or facing tool is provided with a collar having a set screw adapted to enter the relief groove of the twist drill and be tightened in frictional contact therewith.

Another object is to provide a combined drill and facing tool to form a countersunk opening for receiving the cylindrical head of certain screws so that the top of the head will be flush with the work surface.

Another object is to provide a combined drill and countersinking tool in which the countersinking sleeve or collar is provided with a bore of a diameter corresponding to the bore of the twist drill to insure a tight fit of sufficient snugness to permit the countersinking collar or sleeve to be adjusted before the set screw is tightened in place.

Another object is to provide a combined drill and countersinking tool in which relative slippage between the drill and countersinking tool during use will cause the set screw to be more securely anchored in place on the fluted portion of the drill.

Other objects and advantages of the invention will become apparent during the course of the following description of the accompanying drawing and forming a part of the present specification, in which.

Figure 1:
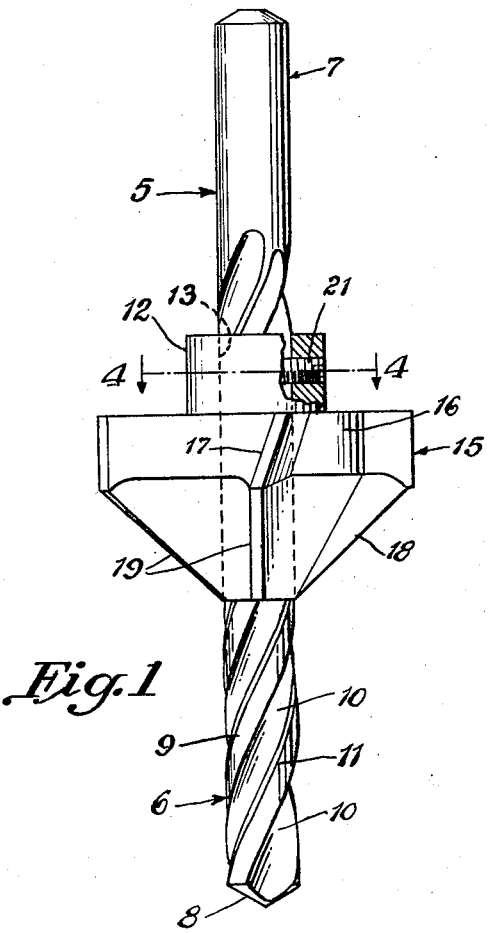
Figure 1 is a side elevational view of a combined twist drill and countersinking tool illustrating a portion thereof broken away in the area of the set screw to show the manner in which the inner end is received in the relief groove between a pair of adjacent flutes.
Figure 3:
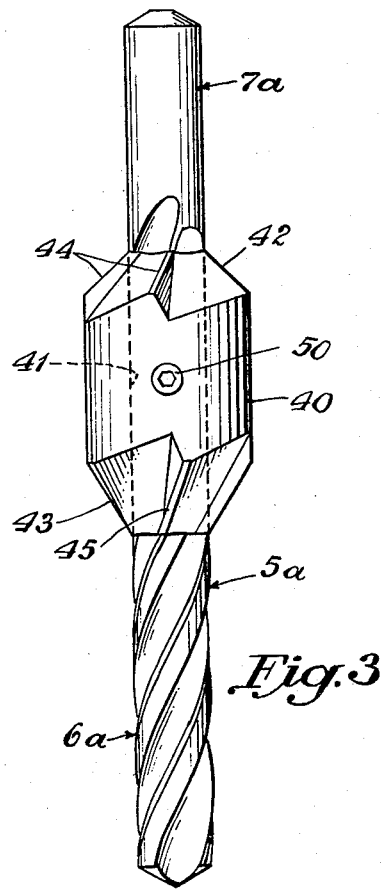
Figure 4:
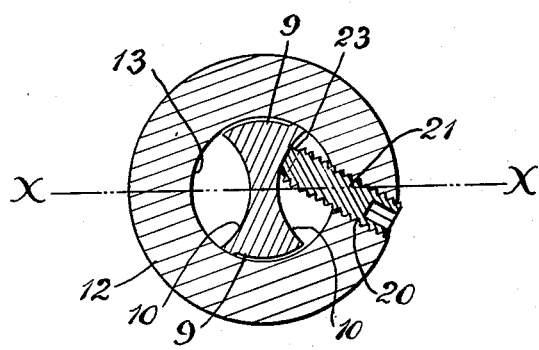

Figure 3 is a side elevational view of a combined drill and countersinking tool showing a modified form of countersinking tool having cutting edges at opposite ends on a different taper angle with respect to the bore axis to permit the countersinking tool to be reversed on the drill and thus present a tapered cutting surface of the desired angle to the workpiece, and Figure 4 is a transverse cross-sectional view taken on line 4—4 of Figure 1 and showing the manner in which the locking Allen set screw has its inner end in frictional engagement at a point slightly offset from the radius of the drill and engaging the relief groove thereof at an angle to the radius.

In the drawing, and more in detail, there is shown in Figures 1 and 4, one embodiment of the invention as applied to a conventional twist drill generally designated 5 having a fluted portion 6 and a shank portion 7. The shank portion 7 is adapted to be inserted in a drill chuck of either a hand or machine tool such as a drill press. The fluted portion 6 of the twist drill has one end pointed as at 8 to provide the usual clearance angle for the end cutting blades and the flutes 9 are spirally arranged to provide intermediate grooves 10 to permit the relief of waste material. As usual, the twist drill is provided with lands 11 to provide a small clearance between the flutes and the cutting edges. On conventional twist drills the root diameter of the relief grooves 10 is slightly smaller near the pointed cutting end 8 than the root diameter of the relief grooves 10 adjacent the shank end. This is intended to increase the strength of the drill and provide an unweakened body portion.

The countersinking attachment shown in Figures 1 and 4 includes a collar 12 having a central bore 13 which is of a diameter slightly greater than the diameter of the flutes 9 so that the lands 11 will snugly fit within the bore 13 of the collar. The collar 12 is integrated with a cutter head generally designated 15 which includes a cylindrical portion 16 having cutting teeth 17 and a tapered portion 18 having cutting teeth 19 extending at an angle of approximately 45° to the axis of the twist drill. The collar 12 is provided with a threaded opening 20 which extends at a slight angle to the radius of the collar as clearly shown in Figure 4. An Allen set screw 21 is threaded in the bore 20 and is provided at one end with a square socket opening for receiving the end of an Allen wrench. The opposite end of the Allen screw 21 is formed with a projection 23 adapted to engage the relief groove 10 at a point slightly offset from the diametral line x—x, Figure 4 and said set screw engagement occurs at an offset point from the root diameter of the relief groove 10 such that rotation of the drill will exert a rotational force on the collar in a direction at an angle to a diametral line which angle is more or less acute and prevents slippage between the countersinking tool and the twist drill at the moment the countersinking tool engages the work and after the twist drill has cut an opening through the work from one side to the other. It will thus be seen, that the Allen locking set screw 21 is arranged so that its axis extends in the direction of rotation of the twist drill with the inner end offset from the longitudinal axis of the twist drill and a diametral line extending at an acute angle to the axis of the set screw.

Figure 2:
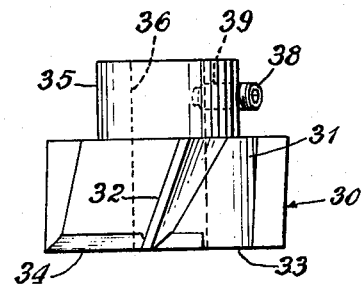
Figure 2 is a side elevational view of a countersinking tool having a modified form of cutting face and showing the same removed from the fluted portion of the twist drill.

In the modified form of the invention shown in Figure 2 the countersinking tool is designed for counterboring a drilled opening having a cylindrical head screw receiving portion in the work surface and as before, the cutter generally designated 30 is provided with a cylindrical body portion 31 having radially extending cutting teeth 32 thereon, the lower face 33 of the cylindrical body portion 31 forms an end wall which is provided with radially extending cutting teeth 34. Formed integral with the cylindrical counterboring cutter 30 is a collar 35 having a central bore 36 which is of a diameter slightly greater than the land diameter of the twist drill 6 so that the tool may fit snugly on said drill and may be adjusted along the fluted portion thereof such as the fluted portion of the drill shown in Figure 1, and in a direction longitudinal to the axis thereof. An Allen locking screw or the like, 38 is received in a bore 39 which extends at an acute angle to a diametral line extending through the axis of the collar 31 and in the direction of rotation of the collar in the same manner as described and disclosed in the forms of the invention shown in Figures 1 and 4 inclusive.

In the modified form of the invention shown in Figure 3 the twist drill is as before generally designated 5a and includes a fluted portion 6a formed on the lower end of a conventional shank 7a. The modified countersinking tool includes a collar or sleeve 40 which is cylindrical and provided with a central opening extending from one end to the other as at 41 and of a diameter slightly greater than the flutes on the fluted portion 6a of the twist drill 5a. The opposite ends of the sleeve or collar 40 are tapered with one end as at 42 being tapered on an angle of substantially 45°, to the bore axis, while the other end is tapered on an angle of approximately 60° as at 43 to the bore axis. Countersink teeth 44 and 45 are formed on the tapered portions of the cylindrical sleeve or collar 40 to permit the cylindrical body to be reversed on the twist drill 5a and thus present either tapered countersinking end to the work surface and cut a countersink opening therein with the tapering wall on a desired angle. The cylindrical body 40 is anchored and adjustably connected to the twist drill 5a by means of an Allen locking set screw 50 in the identical same manner as pointed out and described in connection with the forms of the invention shown in Figures 1, 2 and 4.

In operation, the countersinking tool shown in Figures 1 to 4 inclusive, is connected to the twist drill and adjusted thereon in a longitudinal direction. The Allen set screw is then tightened in place after the countersinking tool has been adjusted properly so that the end thereof engages the bottom of the relief groove at a point offset from a diametral line passing through a section of the drill at right angles to a diametral line passing through the fluted area of the drill. The shank of the twist drill is then placed in the chuck of a drill press or the like, and the drill press is then operated to move the fluted portion 6 of the drill into engagement with the work. As the drill progresses through the work to form an opening therein and after the fluted portions have passed through the work the countersinking tool will then engage the workpiece in the area around the drilled through opening and form a countersink opening therein for receiving a screw or the like having either a tapered head or a cylindrical head with the screw head flush with the workpiece. Thus, a workpiece may be drilled and countersunk simultaneously without requiring separate operations and necessitating chucking separate tools in the drill press or the like. The countersinking tool can be provided with a spiral opening merging with the bore of the tool so that a wedge or the like may be inserted between the collar and the drill with the wedge received in the relief groove and forced into tight engagement therewith.

It is obvious that countersinking tools of various shapes and sizes may be provided with bore openings of different diameters to accommodate twist drills of various land diameters, and that the twist drill receiving bore in the countersinking tool is of sufficient length to engage a major portion of the lands on the flutes of the twist drill and prevent canting or misalignment of the countersink axis with respect to the longitudinal twist drill axis.

In the forms of the invention herewith shown and described there is illustrated a preferred embodiment as well as modifications thereof, and it is to be understood that the forms of the invention shown and described are to be taken as preferred examples and that changes in the shape, size and arrangement of parts may be resorted to without departing from the spirit of the invention or the scope of the subjoined claims.

What I claim is:

1. In combination with a twist drill having spiral flutes, a countersinking tool including a cylindrical body having a bore of a diameter to accept said twist drill, countersinking teeth formed on said countersinking tool and a set screw threaded in a correspondingly threaded opening in said cylindrical body to engage said twist drill with the axis of said set screw extending offset from the bore axis of said body and in a direction of rotation of said twist drill.

2. In combination with a twist drill having spiral flutes spaced by relief grooves the root diameter of which increases from the cutting end of the drill to the shank end, a countersinking tool including a cylindrical body shaped to provide concentric countersinking teeth, a collar formed on said body having a bore co-axial with a bore in said cylindrical body, said bores being of a diameter to accept the twist drill, and a set screw threadedly mounted in an opening in said collar to engage the twist drill in one of the relief grooves thereof between adjacent flutes, the axis of said set screw extending offset from the bore axis of said collar and in the direction of rotation of said drill.

References Cited in the file of this patent
UNITED STATES PATENTS

| 277,859 | Welles | May 15, 1883 |
| 1,267,704 | Skrukrud | May 28, 1918 |

FOREIGN PATENTS

| 19,943 | Great Britain | 1892 |
| 179,880 | Canada | Oct. 23, 1917 |